United States Patent

[11] 3,586,346

| | | |
|---|---|---|
| [72] | Inventor | Wolfgang Sautter<br>Heimerdingen, Wurttemberg, Germany |
| [21] | Appl. No. | 823,404 |
| [22] | Filed | May 9, 1969 |
| [45] | Patented | June 22, 1971 |
| [73] | Assignee | Daimler-Benz Aktiengesellschaft<br>Stuttgart-unterturkheim, Germany |
| [32] | Priority | May 11, 1968 |
| [33] | | Germany |
| [31] | | P 17 55 462.0 |

[54] AXLE SUSPENSION, ESPECIALLY REAR AXLE SUSPENSION FOR MOTOR VEHICLES
26 Claims, 4 Drawing Figs.

[52] U.S. Cl. ................................................ 280/124, 267/20
[51] Int. Cl. .................................................... B60g 9/02
[50] Field of Search .......................................... 180/73; 280/124; 267/20, 15

[56] References Cited
UNITED STATES PATENTS

| 2,746,766 | 5/1956 | Nallinger | 280/124 |
| 3,163,440 | 12/1964 | Vail | 180/73 X |
| 3,277,975 | 10/1966 | Van Winsen | 180/73 |
| 3,402,783 | 9/1968 | Trachte et al. | 180/73 |
| 3,419,100 | 12/1968 | Enke | 180/73 |

*Primary Examiner*—Leo Friaglia
*Attorney*—Craig, Antonelli, Stewart & Hill

ABSTRACT: An axle suspension, in particular a rear axle suspension for motor vehicles, in which each rear wheel is suspended at the vehicle superstructure by two guide members, disposed one above the other, of which one guide member extends substantially in one direction of the vehicle while the other guide member extends in the opposite direction; one guide member of each vehicle side is connected with the wheel carrier in a substantially hingelike manner, and these two guide members are connected with each other so as to pivot in unison about a substantially transversely extending axis.

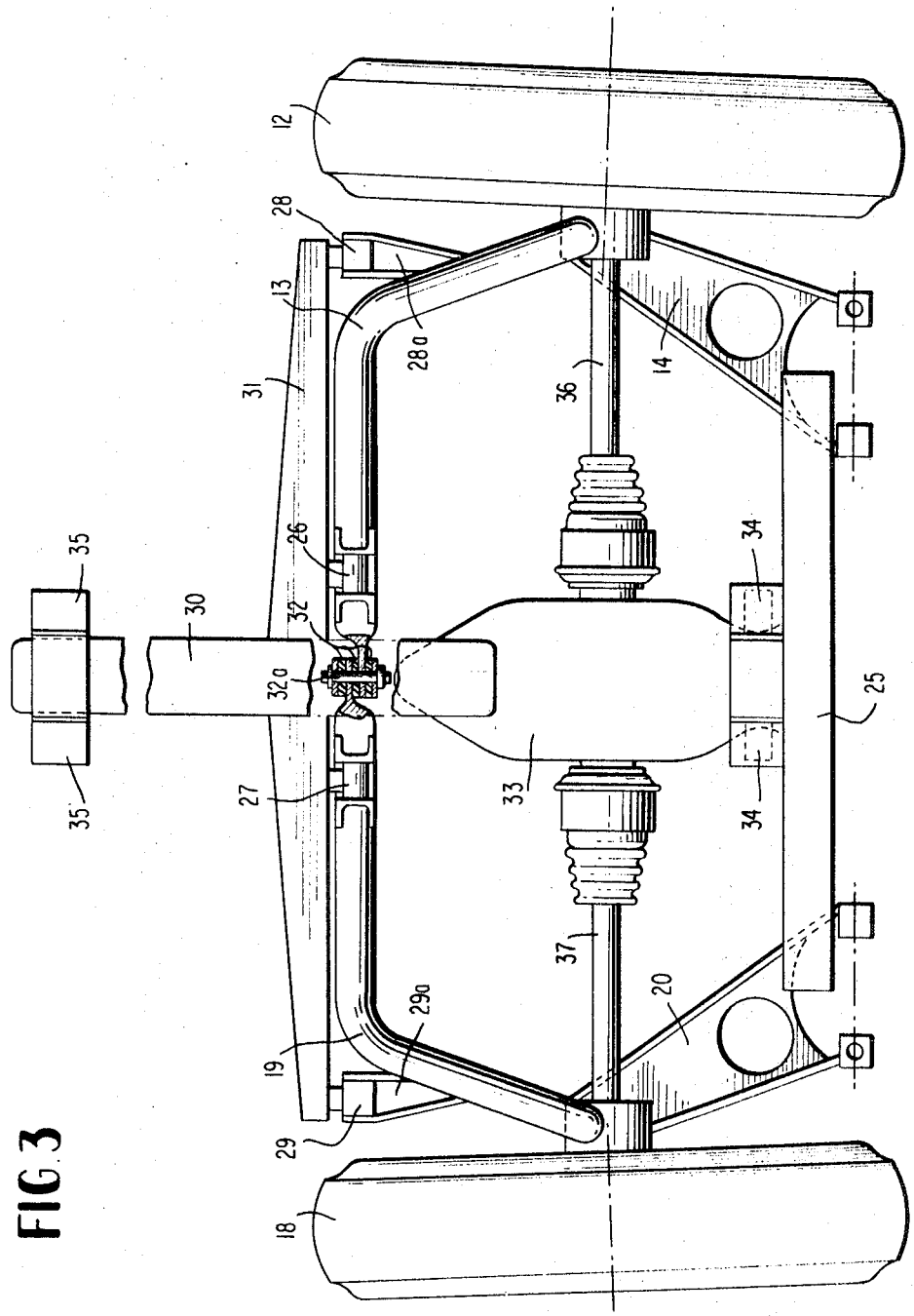

AXLE SUSPENSION, ESPECIALLY REAR AXLE SUSPENSION FOR MOTOR VEHICLES

The present invention relates to an axle suspension, especially to a rear axle suspension for motor vehicles, having superposed guide elements guiding the wheel carriers as coupler means.

An aim of the present invention resides in a type of construction of a rear axle which combines far-reachingly the advantages of a rigid axle suspension with those of an independent wheel suspension, particularly to the effect that the drive properties are improved while maintaining camber, toe-in and wheel track as constant as possible.

Accordingly, the present invention essentially resides in that one guide member of each of the two vehicle sides, especially the upper guide members pivoting in a vehicle longitudinal plane about a vehicle transverse axis, are torsionally coupled and are supported in common at the vehicle superstructure on a support member pivotal about a center vehicle longitudinal axis.

Preferably, the guide members torsionally connected with each other such as, for example, the guide members extending rearwardly from the wheel carrier, are connected corner-rigid, i.e., hingelike with the wheel carriers only as viewed in longitudinal view of the vehicle, and the wheel carriers are connected by universal joints with the other guide members, for example, with the lower guide members extending forwardly from the wheel carriers. The wheel carriers thereby pivot, in reference to the common support member, in parallel or nearly parallel longitudinal planes whereby they are forcibly kept in these planes by the first-mentioned guide members. In order to absorb the relative movements between the axle aggregate and the vehicle superstructure that occur during the pivoting about the center longitudinal axis, the inner guide arms directed inwardly of the vehicle at the second-mentioned guide members which are appropriately constructed as triangular guide members, are movable in the vehicle longitudinal direction, and the outer guide arms disposed toward the outside of the vehicle are essentially immovably supported and/or supported in the vehicle longitudinal direction.

Accordingly, it is an object of the present invention to provide an axle suspension, especially a rear axle suspension for motor vehicles, which avoids by simple means the aforementioned shortcomings and drawbacks.

Another object of the present invention resides in a rear axle suspension for motor vehicles which combines the advantages of the rigid axle suspension with those of an independent wheel suspension, particularly as regards driving properties.

A further object of the present invention resides in a rear axle suspension of the type described above which considerably improves the driving comfort while maintaining the camber, toe-in and wheel track as constant as possible.

These and further objects, features, and advantages of the present invention will become more obvious from the following description when taken in connection with the accompanying drawing which shows, for purposes of illustration only, one embodiment in accordance with the present invention and wherein:

FIG. 3 is a top plan view of the axle suspension of FIG. 1; and

FIG. 4 is a partial, exploded view of the rotatable supports of the axle suspension according to FIG. 1.

Figure 1:
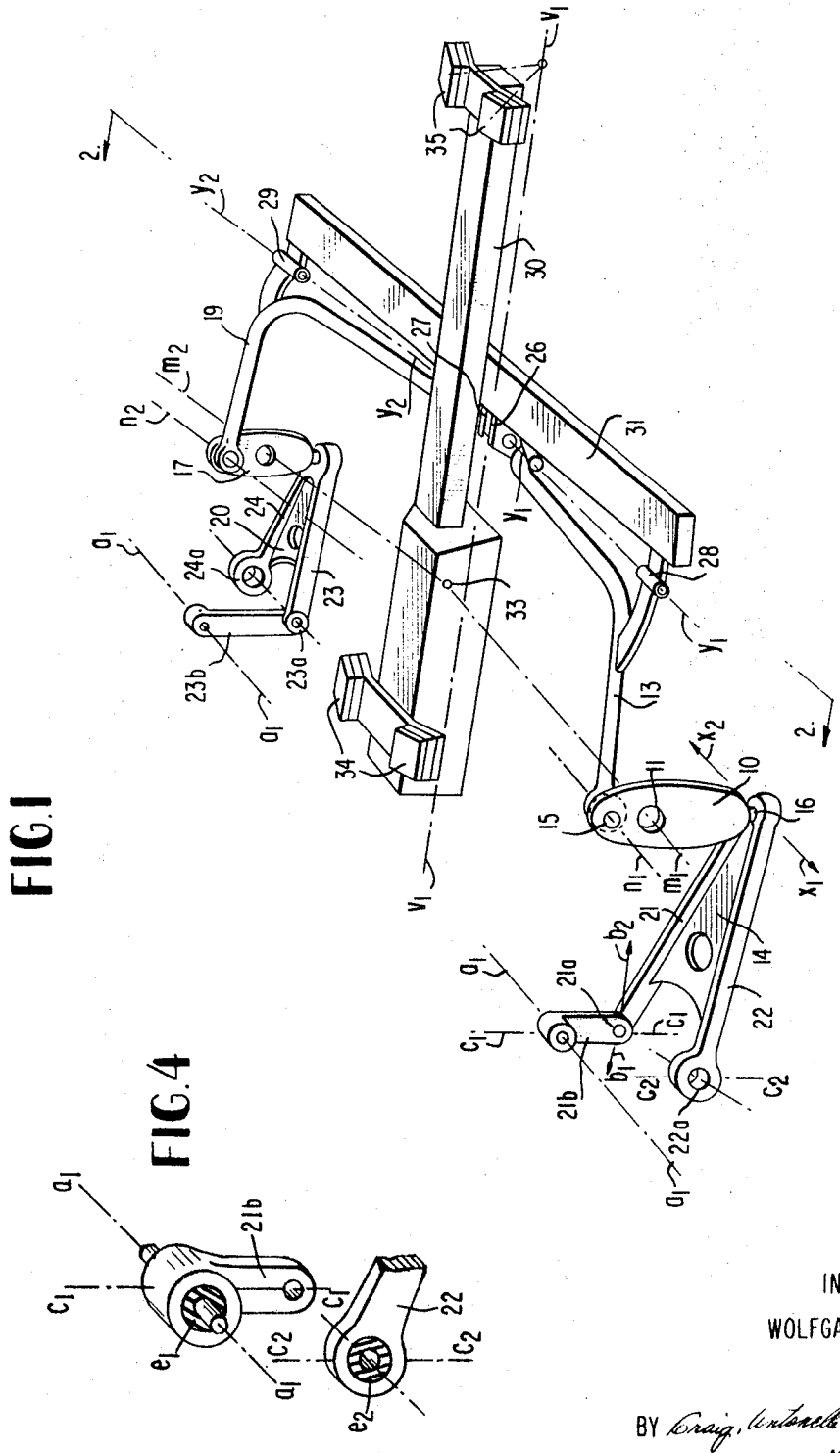
FIG. 1 is a perspective schematic view of the axle suspension in accordance with the present invention.
Figure 2:
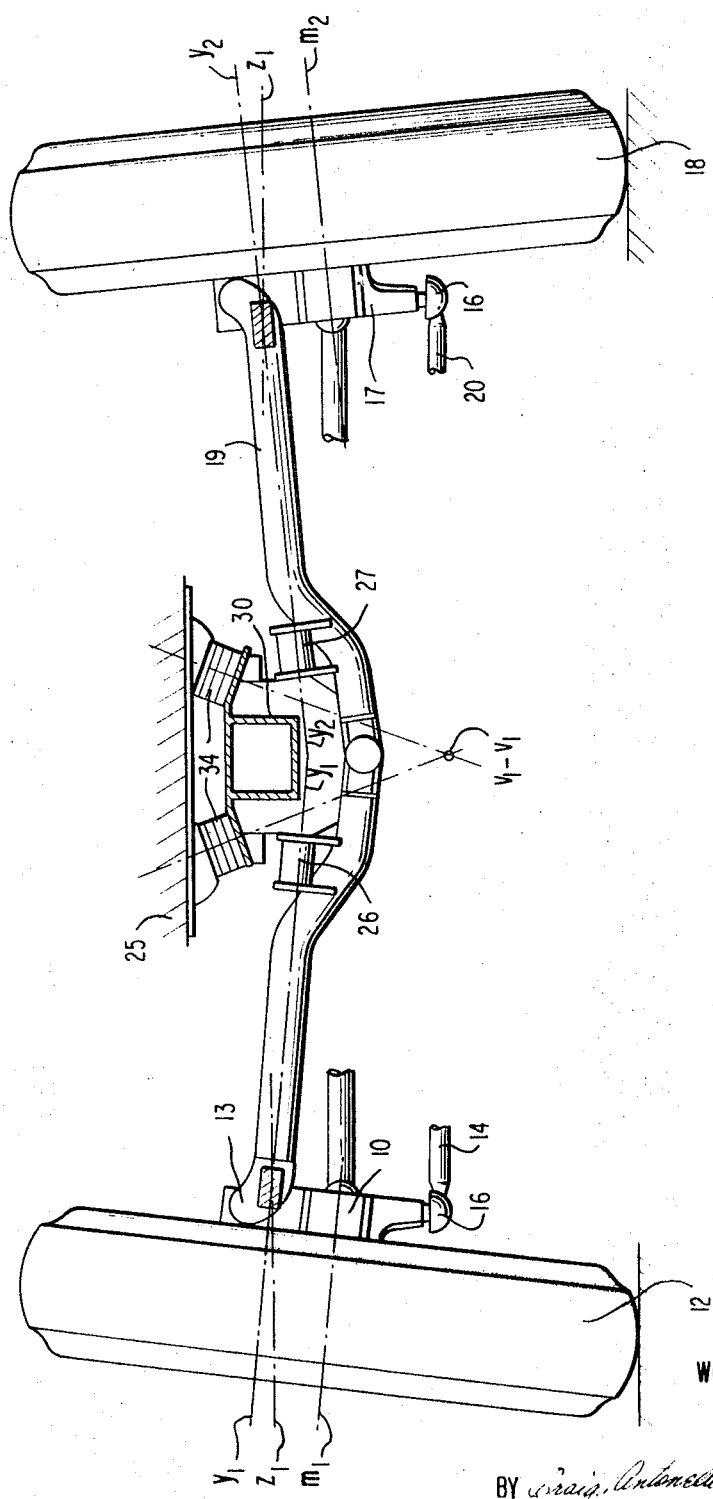
FIG. 2 is a cross-sectional view taken along line 2-2 of FIG. 1.

Referring now to the drawing, wherein like reference numerals are used throughout the various views to designate like parts, the left wheel carrier 10 (FIGS. 1 and 2) whose wheel support 11 serves for the support of a rear wheel 12, connects with each other the guide members 13 and 14 disposed one above the other. The upper guide member 13 extending rearwardly from the wheel carrier 10 is connected with the wheel carrier 10 in a hingelike manner by a corner-rigid pivot joint 15, which is corner-stiff as viewed in the vehicle longitudinal direction, and the wheel carrier 10 is supported at the lower guide member 14 by means of a universal joint 16, for example, a ball joint. The right wheel carrier 17 with the wheel support 17a for the support of the rear wheel 18 is connected in a similar manner with the upper and lower right guide members 19 and 20.

The lower guide members 14 and 20, supported at the vehicle superstructure by springs (not shown), for example, coil springs, are constructed as triangular guide elements which are pivotally suspended at the vehicle superstructure 25 by means of their guide arms 21,22 and 23, 24. The inner guide arms 21 and 23 of the lower triangular guide members 14 and 20 which are directed inwardly of the vehicle, are movably supported in the vehicle longitudinal direction $b_1$, $b_2$ of the vehicle superstructure 25 about the vehicle cross axis $a_1$–$a$ by means of shackles or links 21$b$ and 23$b$ connected with the same by means of joints 21$a$ and 23$a$ and simultaneously are rotatably supported to a limited extent about vertical axes, for example, $c_1$–$c$, for example, by means of the interposition of rubber cushions $e$ as shown in FIG. 4. The outer guide arms 22 and 24 of the lower triangular guide members 14 and 20 arranged on the outside of the vehicle are pivotal in the illustrated embodiment at the ends thereof in joints 22$a$ and 24$a$ at the vehicle superstructure 25 like the links 21$b$ and 23$b$ in planes parallel to the vertical vehicle center longitudinal plane and similarly to the mentioned links 21$b$ and 23$b$ are rotatably supported to a limited extent about vertical axes, for example $c_2$–$c_2$, by means of rubber cushions $e_2$ as shown in FIG. 4. The triangular guide members 14 and 22 are thereby able to pivot in a vehicle longitudinal plane about the pivot axis $a_1$–$a_1$ thereof and are able to carry out simultaneously a pivot movement about a vertical axis, for example, $c_2$–$c_2$, extending through the bearing joint 22$a$ and 24$a$ of the vehicle outer guide arms 22 and 24 so that the joints 16 connecting the same with the wheel carriers 10 and 17 can move or deflect in the vehicle transverse direction $x_1$–$x_2$.

The upper guide members 13 and 19 are also pivotally supported about mutually slightly inclined axes $y_1$–$y_1$ and $y_2$–$y_2$, on the one hand, within the area of the vertical, vehicle longitudinal center plane by means of bearings 16 and 27 and, on the other hand, in wheel proximity by means of bearings 28 and 29. The guide members 13 and 19 are provided for that purpose with laterally extending arms, for example, arms 28$a$ and 29$a$, whereas the bearings 28 and 29 themselves are arranged at a cross bearer member 31 of the support member 30. The upper guide members 13 and 19 for the purpose of a common pivoting approximately about the vehicle transverse axis $z_1$–$z_1$, are connected with each other corner-rigid or corner-stiff by means, for example, of disc or lamellaelike rubber elements 32 (Fig. 3) arranged in the vertical vehicle longitudinal center plane having a coupling element 32$a$ connecting the same and arranged in the vehicle longitudinal direction. Elements 32 enable a slight yieldingness in the vehicle longitudinal direction in order to be able to absorb the movement differences of the guide members 13 and 19 during pivoting about the pivot axes $y_1$–$y_1$ and $y_2$–$y_2$ thereof. The arrangement is thereby made in such a manner that the axes $n_1$ and $n_2$ of the upper joints 15 connecting the wheel carriers 10 and 17 with the upper guide members 13 and 19 as well as the center axes $m_1$ and $m_2$ of the wheel or wheel pins extend parallel to the associated pivot axes $y_1$–$y_1$ and $y_2$–$y_2$, respectively.

The support member 30 and rear axle housing 33 are combined into a unit so that the latter forms a part of the support member 30. The support member 30 is elastically supported at its front end at the vehicle superstructure within the area of the rear axle housing 33 by means of inclined rubber bearings 34 and its rear end by means of correspondingly arranged rubber bearings 35 in such a manner that it pivots about a lower vehicle longitudinal axis $v_1$–$v$ determining the instantaneous center and located outside of the support member. Any desired position of the aforementioned longitudinal axis close to the ground can thus be achieved by the arrangement of the rubber bearings without having to reduce the ground or road clearance of the rear axle unit.

The suspension of the rear axle housing 33 can also take place separately from the support member 30. The support member 30 is constructed relatively long toward the rear in order to achieve a side-force withstanding and a good curve drive beginning. The drive of the wheels 12 and 18 takes place by double-jointed shafts 36 and 37 (FIG. 3).

The wheel suspension according to the present invention produces the following movement conditions:

1. By reason of the torsional coupling of the guide members 13 and 19, the latter act in a manner similar to a rigid axle. The lifting movement of a wheel, for example, as a result of a ground or road unevenness, is transmitted by means of the guide members to the oppositely disposed wheel whereby the guide members pivot at the support members 30 about the pivot axes $y_1-y_1$ and $y_2-y_2$ thereof, i.e., approximately about the common cross axis $z_1-z_1$. With unequal spring strokes of the two wheels, the entire unit consisting of support member 30 (including rear axle housing 33) and guide members 13 and 19 can assume an inclined position relative to the vehicle superstructure about the longitudinal axis $v_1-v_1$.

2. By reason of the corner-rigid connection of the guide members 13 and 19 with the wheel carriers 10 and 17, the wheel carriers 10 and 17 are forcibly guided by the guide members 13 and 19 in planes which are disposed perpendicularly to the pivot axes $y_1-y_1$ and $y_2-y_2$ and thus preserve their inclination relative to the support member 30. The inclination of the pivot axes determine thereby the camber of the wheel with respect to the wheel axes, for example parallel to wheel axis 11. The latter — as also the toe-in and nearly also the wheel track of the wheels — remains constant corresponding to the characteristic features of a rigid axle.

3. The cross movements of the lower wheel carrier joints, for example of joint 16, which result during pivoting of the upper guide members 13 and 19 about the slightly inclined pivot axes $y-y_1$ and $y_2-y_2$, and above all, however, with a pivot movement of the support member 30 abut the longitudinal axis $v_1-v_1$, are unconstrainedly absorbed by the lower guide members 14 and 20 by reasons of their rotational yieldingness about the vertical axes $c_2-c_2$ extending through the vehicle outer bearing joints 22a and 24a. The guide members 14 and 20 are able to deflect in the vehicle transverse direction $x_1$ and $x_2$ without exerting a guide function on the wheel carrier a regards the rotating position thereof (in relation to the driving direction), apart from the absorption of the thrust forces acting in the vehicle longitudinal direction and of the brake and drive moments acting about the wheel center axis which are each absorbed in unison by the two guide members 13, 14, and 19 and 20 interconnected by the wheel carriers as a coupler.

While I have shown and described only one embodiment in accordance with the present invention, it is understood that the same is not limited thereto but is susceptible of numerous changes and modifications as known to a person skilled in the art. For example, the upper and lower guide members can also be interchanged with each other so that the lower guide member is constructed as guide member connected corner-rigid with the wheel carrier as seen in longitudinal view and is connected torsion-rigid with the corresponding opposite guide member. Also, the spring may be supported, instead of at the lower guide member, at the upper member or guide member in the sense described above. Thus, I do not wish to be limited to the details shown ad described herein but intend to cover all such changes and modifications as are within the scope of those skilled in the art.

I claim:

1. An axle suspension, especially a rear axle suspension for motor vehicles having a superstructure and wheels located on opposite sides, comprising for each wheel, guiding wheel carrier means, upper guide means, lower guide means for connecting the wheel carrier means to the superstructure, bearing support means for pivotally mounting one of said upper and lower guide means substantially about a transverse axis of the vehicle, means for coupling said one guide arm of oppositely located wheels for mutual entrainment in the torsional direction, and yielding support means for supporting the bearing support means at the superstructure, wherein the yielding support means has a resiliency relative to the superstructure about a longitudinal axis of the vehicle.

2. An axle suspension according to claim 1, characterized in that said one guide means are the upper guide means.

3. An axle suspension according to claim 1, characterized in that said one guide means are connected with the wheel carrier means corner-rigid, as seen in longitudinal view of the vehicle and in plan view, and in that said wheel carrier means are connected with the other guide means by universal joint means.

4. An axle suspension according to claim 3, characterized in that said one guide means are the upper guide means and extend essentially rearwardly from the wheel carrier means, and the other guide means are the lower guide means extending essentially forwardly from the wheel carrier means.

5. An axle suspension according to claim 4, characterized in that the other guide mans are constructed as triangular guide structures each having an innner guide arm directed inwardly of the vehicle and an outer guide arm disposed on the vehicle outside, the inner guide arms of said triangular guide structures being supported movably in the vehicle longitudinal direction, and the outer guide arms thereof being supported substantially immovably in the vehicle longitudinal direction.

6. An axle suspension according to claim 5, characterized in that the inner guide arms are movably suspended at the vehicle superstructure by mean of link members pivotal in the vehicle longitudinal direction.

7. An axle suspension according to claim 6, characterized in that the one guide means torsionally coupled with each other are supported at the bearing support means about mutually inclined transversely disposed pivot axes for pivoting movements in unison.

8. An axle suspension according to claim 7, characterized in that the wheel axes are arranged substantially parallel to the pivot axes of the one guide means and to the joint axes of joint means connecting the one guide means with the wheel carrier means.

9. An axle suspension according to claim 8, characterized in that the one guide means are torsionally coupled with each other by elastic substantially disc-shaped elements having a disc axis disposed substantially in a vehicle longitudinal plane and forming part of said coupling means.

10. An axle suspension according to claim 9, characterized in that the one first guide means are supported in the transversely disposed pivot axes thereof at the pivotal support means, on the one hand, within the area of the vertical vehicle longitudinal center plane and, on the other, in wheel proximity at a cross bearer means of the bearing support means.

11. An axle suspension according to claim 10, characterized in that the yielding support means is inclined so that the bearing support means pivots about a vehicle longitudinal center axis disposed lower than the bearing support plane.

12. An axle suspension according to claim 11, characterized in that said last-mentioned vehicle longitudinal center axis is disposed outside of the bearing support means.

13. An axle suspension according to claim 12, characterized in that the bearing support means includes a rear axle housing.

14. An axle suspension according to claim 13, characterized in that the bearing support means is extended in the rearward direction and is elastically supported at the vehicle superstructure at as large as possible a distance from the wheel center axis of the wheels.

15. An axle suspension according to claim 3, characterized in that the other guide means are constructed as triangular guide structures each having an inner guide arm directly of the vehicle and an outer guide arm disposed on the vehicle outside, the inner guide arms of said triangular guide structures being supported movably in the vehicle longitudinal direction, and the outer guide arms thereof being supported substantially immovably in the vehicle longitudinal direction.

16. An axle suspension according to claim 15, wherein said other guide means are the lower guide means.

17. An axle suspension according to claim 16, characterized in that the one guide means are the upper guide means.

18. An axle suspension according to claim 15, characterized in that the inner guide arms are movably suspended at the vehicle superstructure by means of link members pivotal in the vehicle longitudinal direction.

19. An axle suspension according to claim 1, characterized in that the one guide means torsionally coupled with each other are supported at the bearing support means about mutually inclined transversely disposed pivot axes for pivoting movements in unison.

20. An axle suspension according to claim 3, characterized in that the wheel axes are arranged substantially parallel to the pivot axes of the one guide means and to the joint axes of joint means connecting the one guide means with the wheel carrier means.

21. An axle suspension according to claim 1, characterized in that the one guide means are torsionally coupled with each other by elastic substantially disc-shaped elements having a disc axis disposed substantially in a vehicle longitudinal plane.

22. An axle suspension according to claim 1, characterized in that the one guide means are supported in the transversely disposed pivot axes thereof at the pivotal support means, on the one hand, within the area of the vertical longitudinal center plane and, on the other, in wheel proximity at a cross bearer means of the bearing means.

23. An axle suspension according to claim 1, characterized in that the yielding support means is inclined, so that the bearing support means pivots about a vehicle longitudinal center axis disposed lower than the bearing support plane.

24. An axle suspension according toe claim 23, characterized in that said last-mentioned vehicle longitudinal center axis is disposed outside of the bearing support means.

25. An axle suspension according to claim 23, characterized in that the bearing support means includes a rear axle housing.

26. An axle suspension according to claim 23, characterized in that the bearing support means is extended in the rearward direction and is elastically supported at the vehicle superstructure at as large as possible a distance from the wheel center axis of the wheels.